(12) United States Patent
Keown et al.

(10) Patent No.: US 7,251,656 B2
(45) Date of Patent: Jul. 31, 2007

(54) ELECTRONIC PAYMENTS USING MULTIPLE UNIQUE PAYEE IDENTIFIERS

(75) Inventors: Blake Keown, Lewis Center, OH (US); Peter Moenickheim, Dublin, OH (US); Howard Baulch, Dublin, OH (US); Adam Koltnow, Delaware, OH (US)

(73) Assignee: CheckFree Corporation, Norcross, GA (US)

( * ) Notice: Subject to any disclaimer, the term of this patent is extended or adjusted under 35 U.S.C. 154(b) by 462 days.

(21) Appl. No.: 10/205,615

(22) Filed: Jul. 26, 2002

(65) Prior Publication Data

US 2004/0019605 A1    Jan. 29, 2004

(51) Int. Cl.
*G06F 17/30* (2006.01)
(52) U.S. Cl. .............................. 707/10; 707/3; 705/42; 705/40; 709/203
(58) Field of Classification Search ................ 707/1–6, 707/9, 10, 104.1; 705/1, 30, 34, 40, 42, 44, 705/17, 18, 21, 35; 709/203
See application file for complete search history.

(56) References Cited

U.S. PATENT DOCUMENTS

| | | | |
|---|---|---|---|
| 4,823,264 A | 4/1989 | Deming | 705/39 |
| 5,025,373 A | 6/1991 | Keyser, Jr. et al. | 705/42 |
| 5,220,501 A | 6/1993 | Lawlor et al. | 705/40 |
| 5,283,829 A | 2/1994 | Anderson | 705/40 |
| 5,326,959 A | 7/1994 | Perazza | 235/379 |
| 5,336,870 A | 8/1994 | Hughes et al. | 235/379 |
| 5,383,113 A | 1/1995 | Kight et al. | 705/40 |
| 5,420,405 A | 5/1995 | Chasek | 235/379 |
| 5,465,206 A | 11/1995 | Hilt et al. | 705/40 |
| 5,504,677 A | 4/1996 | Pollin | 705/45 |
| 5,677,955 A | 10/1997 | Doggett et al. | 705/76 |
| 5,699,528 A | 12/1997 | Hogan | 705/40 |
| 5,710,889 A | 1/1998 | Clark et al. | 235/379 |

(Continued)

FOREIGN PATENT DOCUMENTS

EP    1049056 A2 *  11/2000

*Primary Examiner*—Cheryl Lewis
(74) *Attorney, Agent, or Firm*—Sutherland Asbill & Brennan LLP

(57) ABSTRACT

To make a payment to a payee on behalf of a payor, the payment service provider receives, via a network, a first payment request to make a first payment to a payee on behalf of a first payor and a second payment request to make a second payment to the payee on behalf of a second payor. The first request has first identity information identifying the payee and the second request has second identity information identifying the payee. The payment service provider accesses first data associated with the first payor to identify a first unique payee identifier associated with the payee based on the first payee identity information and second data associated with the second payor to identify a different second unique payee identifier associated with the payee based on the second payee identity information. The payment service provider retrieves first electronic payment information for the payee based on the identified first unique payee identifier and different second electronic payment information for the payee based on the identified second unique payee identifier. The payment service provider can then direct a first electronic payment to the payee on behalf of the first payor based upon the retrieved first electronic payment information and a second electronic payment to the payee on behalf of the second payor based upon the retrieved second electronic payment information.

15 Claims, 8 Drawing Sheets

U.S. PATENT DOCUMENTS

| | | | |
|---|---|---|---|
| 5,727,249 A | 3/1998 | Pollin | 705/40 |
| 5,794,221 A | 8/1998 | Egendorf | 705/40 |
| 5,873,072 A | 2/1999 | Kight et al. | 705/40 |
| 5,884,288 A | 3/1999 | Chang et al. | 705/40 |
| 5,920,847 A | 7/1999 | Kolling et al. | 705/40 |
| 5,920,848 A | 7/1999 | Schutzer et al. | 705/42 |
| 5,966,698 A | 10/1999 | Pollin | 705/34 |
| 5,974,146 A | 10/1999 | Randle et al. | 705/77 |
| 5,978,780 A | 11/1999 | Watson | 705/40 |
| 6,029,150 A | 2/2000 | Kravitz | 705/39 |
| 6,032,133 A | 2/2000 | Hilt et al. | 705/40 |
| 6,098,053 A | 8/2000 | Slater | 705/44 |
| 6,188,994 B1 | 2/2001 | Egendorf | 705/40 |
| 6,202,054 B1 * | 3/2001 | Lawlor et al. | 705/42 |
| 6,311,170 B1 | 10/2001 | Embrey | 705/40 |
| 6,317,745 B1 * | 11/2001 | Thomas et al. | 707/100 |
| 6,327,577 B1 * | 12/2001 | Garrison et al. | 705/40 |
| 6,363,362 B1 * | 3/2002 | Burfield et al. | 705/40 |
| 6,678,664 B1 * | 1/2004 | Ganesan | 705/39 |
| 2001/0037295 A1 | 11/2001 | Olsen | 705/40 |

* cited by examiner

| NAME | ALTERNATE NAME | ADDRESS | ZIP | PHONE | OTHER | REMITTANCE CENTER | UNIQUE IDENTIFIER |
|---|---|---|---|---|---|---|---|
| Payee 1 | | | | | | 1 | YZK147 |
| Payee 2 | | | | | | 2 | 89AB49Q |
| Payee 3 | | | | | | 1 | RBQ746 |
| Payee N | | | | | | 1 | |
| | | | | | | 2 | |

Figure 8

ELECTRONIC PAYMENTS USING MULTIPLE UNIQUE PAYEE IDENTIFIERS

CROSS-REFERENCE TO RELATED APPLICATIONS

This application is related to U.S. patent application Ser. No. 10/205,614, entitled "A TECHNIQUE FOR SELF-ENROLLMENT IN AN ELECTRONIC COMMERCE SERVICE" filed concurrently herewith.

FIELD OF THE INVENTION

The present invention relates to electronic commerce and more particularly to processing information associated with payees of an electronic commerce service provider.

BACKGROUND OF THE INVENTION

Today a myriad of electronic commerce services exist. One popular electronic service is the service of making payments to payees on behalf of payors. This service is often called an on-line payment service, though neither the payment request nor the payments themselves actually have to be made on-line. Provision of an on-line payment service includes a payor (customer of a payment service provider) directing the payment service provider, typically on-line, though it could be via telephone or another form of electronic communications, to make a payment on behalf of the payor to a payee (which may or may not be a customer of the payment service provider). These payments are often bill payments, though other types of payments are also common, such as person-to-person payments and payments for goods or services purchased via the Internet or other computing networks. Upon receipt of a payment request, the service provider makes payment to the payee on behalf of the payor. The assignee of the present application, CheckFree Services Corporation, is a pioneer in providing on-line payment services.

FIG. 1 depicts operations of a typical prior art on-line payment service. A payor 100 transmits a payment request to a payment service provider 105. The payment service provider 105 could be CheckFree or any other payment service provider. The payment service provider 105 receives the payment request, processes the request to determine a form of payment, and then pays payee 110 based upon the received payment request and determined form of payment. As shown, the determined form of payment can be check, draft or electronic funds transfer.

In making payments on behalf of payors, a payment service provider can make payments to a payee (that is, deliver funds) by one of several methods. Payment can be made by check drawn on an account associated with the payment service provider, can be made by a draft drawn on an account associated with the payor, and can be made electronically, as will be discussed further below.

As will be understood by one skilled in the art, electronic payments are more cost effective for both a payment service provider and payee than payments made by check or draft (paper payments). Paper payments have inherent disadvantages over electronic payments. Processing costs (including generation and handling) are higher for paper payments than electronic payments. Also, paper payments take longer to complete than electronic payments. Another disadvantage with paper payments is that such payments are not easily reversible, while electronic payments (based upon agreement with a payee) are. As a result of these disadvantages, it is preferable for payments to be made electronically.

For payment made by check or draft, remittance information (such as payor name, account number with the payee, etc.) is typically delivered to the payee along with the check or draft. For electronic payments, remittance information is typically delivered electronically. It should be noted that electronic remittance information can be part of an electronic payment, or a separate transmission.

An electronic payment is made by electronic funds transfer directly to a payee's deposit account from an account associated with a payment service provider. Typically, electronic payments are made to only large, sophisticated commercial payees, though other types of payees could certainly receive electronic payments. In one form of electronic funds transfer, CheckFree utilizes the Federal Reserve's Automated Clearing House Network (ACH). For payments made via the ACH Network, the payee provides CheckFree with information identifying the payee's deposit account maintained at a financial institution. CheckFree transfers funds to the payee's financial institution via the ACH Network, which in turn credits those funds to the payee's deposit account. CheckFree also transmits remittance information via the ACH Network to the payee's financial institution, which in turn delivers that remittance information to the payee. While fees associated with using the ACH Network are low, CheckFree's use of this payment channel is limited to those payees whose financial institutions offer remittance advice delivery service and who utilize their financial institutions' remittance advice delivery service. One drawback to the use of the ACH Network is that there is no available listing of all payees who are accessible via the ACH Network. Thus, the only payments that can be made to a payee by a payment service provider via the ACH Network are payments to those payees who have provided a payment service provider with deposit account identifying information.

For some electronic payments, CheckFree has utilized networks maintained by credit card companies, such as MasterCard's RPS service, and VISA's E-Pay service. In such payments, funds and/or remittance information move to a payee via a credit card company's network. This service has been attractive to many payees whose financial institutions do not offer a remittance delivery service. While fees charged by credit card companies for use of their networks are slightly greater than the fees charged by the Federal Reserve System, an advantage to such systems is that credit card companies routinely publish directories of all payees as well as the data required to send payments to those payees through the credit card networks.

There still remain payees who are not associated with financial institutions which offer remittance advice delivery service, not associated with any credit card company network, or simply choose not to utilize either of these services. In response, CheckFree developed its proprietary DIRECT SEND system in which CheckFree utilizes the ACH to send funds to the payee, but independently sends an electronic remittance data file to the payee. This innovation dramatically increased the number of payees receiving electronic payment from CheckFree.

The combination of electronic payments via the ACH Network, via a credit card network, and via the DIRECT SEND system account for the majority of payments made by CheckFree on behalf of payors. The remaining payments are typically made by either check or draft, a determination of which can be based upon risk processing methods.

Paper payments can be divided into two categories: payments to businesses without electronic remittance capabilities, and payments to individuals. There are varied reasons why these payees do not receive electronic payments, including, as discussed above, no relationship with financial institutions which offer remittance advice delivery service, no relationship with a credit card payment network such as MasterCard's RPS network or VISA's E-Pay network, as well as a low volume of received payments from CheckFree, making DIRECT SEND somewhat cost prohibitive, especially for individual payees. Accordingly, a need exists to overcome these barriers to increasing the number of payments made electronically to payees by payment service providers.

FIG. 2 depicts a typical payment processing system 200 maintained by a payment service provider. The depicted payment service provider system 200 could be associated with any payment service provider. System 200 includes a server 202, an electronic payee database 212, a rules database 210, and a memory 230. It will be understood that other components could be, and typically are, included in such a system 200, such as communications interfaces and other databases, though these components are not depicted in FIG. 2. It will also be understood that the memory 230 could store one or more of the various databases, as well as programming which drives the operation of the server 202, as well as other data processed by the server 202 and generated by the server 202.

As shown, server 202 is configured to receive payment requests 201, which each include at least a payment amount and information identifying a payee. This identifying information could be merely a payee's name, or could include further identifying information such as payee address, phone number, or payor's account number with the payee. If only a payee's name is supplied by the payor, it will be understood by those skilled in the art that the payor has previously supplied additional payee identifying information to the payment service provider. This information would be stored in memory 230.

Information identifying payees which can be paid electronically is stored in the electronic payee database 212. These payees have supplied deposit account information to the payment service provider such that the payment service provider can make electronic payments to these payees. For non-electronic payees, who currently receive paper payments, the process to become an electronic payee includes multiple steps, including supplying deposit account information as well as criteria for delivery of remittance information. This can be a time consuming endeavor that many payees have chosen not to participate in. According, a need exists for an enrollment technique to become an electronic payee which overcomes this barrier to increasing the number of electronic payees.

Upon receiving a payment request 201, the payment service provider's server 202, among other processing, determines if the indicated payee is included in the electronic payee database 212. That is, the service provider determines if payment to that payee can be made electronically. The process for determining if the payee is included in the electronic payee database 212 is driven by rules stored in rules database 210. The rules dictate combinations of payor and/or payee identifying information to use in determining if any given payee is included in the electronic payee database 212.

Large payees typically have multiple remittance centers. A remittance center is a location to which payments and remittance information from a payor to a payee are delivered. That is, for a large payee, a first payor may be required to remit payment to a first remittance center, while a second payor, perhaps geographically distant from the first payor, may be required to remit payment to a second remittance center. As shown in FIG. 3, the electronic payee database 212 includes information identifying multiple payees, i.e., payees 1–3. The stored information includes payee name 301 and information identifying one or more remittance centers 305. As shown payee one is associated with three remittance centers. Payee two is associated with a single remittance center and payee three is associated with two remittance centers. It should be understood that stored remittance center information identifies deposit accounts to which payment should be credited as well as locations, electronic or physical, to which remittance information should be delivered.

For a payee having multiple remittance centers, the payment service provider must determine the proper remittance center for a particular payor requesting that payment be made to the payee on his or her behalf. Rules stored in the rules database 210 are not only used to determine if a payee is included in the electronic payee database 212, but to determine the proper remittance center to which payments and/or remittance advice should be directed if an electronic payee has multiple remittance centers. These rules can be tailored for specific payees, based upon a specific payee's business rules.

In one implementation utilized by CheckFree, the rules are used to identify a proper remittance center based upon the payor's zip code. Thus, in its most simplistic form, a proper remittance center is selected based upon the zip code in which the payor resides. It should be noted that geographic location is not the only criteria available for determining a proper remittance center to which a payor should remit payment.

The rules database 210 can also store rules to identify electronic payees and/or identify proper remittance centers based upon unique payee name variations, payee account number structures, as well as payee account number ranges. Thus, for example, based upon a payee name supplied by a payor, a proper remittance center could be selected. Thus, a single company could be doing business under various names. Also, based upon the payor's account number with the payee a proper remittance center could be selected.

While the use of rules has been successfully utilized by payment service providers in identifying electronic payees and/or determining proper remittance centers, deficiencies have arisen in the use of rules. For example, certain payees do not have remittance centers based upon payor zip codes. That is, two payors residing in the same zip code may be associated with different remittance centers for the same payee. Also, often two or more electronic payees are physically located in the same zip code. And, many payees do not have, for example, standardized name variations which can be used to identify electronic payees and/or remittance centers or standardized payee account number structure or ranges which can be used to identify remittance centers. Accordingly, a need exists for a technique to identify information associated with electronic payees and/or proper remittance centers for which standardized rules cannot be utilized to do so.

OBJECTS OF THE INVENTION

It is an object of the present invention to provide a technique to increase the number of payees receiving electronic payments from payment service providers.

It is also an object of the present invention to provide a technique to simplify the enrollment process to receive electronic payments.

It is another object of the present invention to provide a technique to identify payees capable of receiving electronic payments.

The above-stated objects, as well as other objects, features, and advantages, of the present invention will become readily apparent from the following detailed description which is to be read in conjunction with the appended drawings.

SUMMARY OF THE INVENTION

In accordance with the present invention, a method and a system for accessing a database identifying electronic payees are provided. An electronic payee is any individual, business, or other organization that has provided an entity that makes payment to that payee information enabling that entity to make an electronic payment to the payee. In electronic payment funds are credited to a payee without the need for paper instructions. An electronic payment could be made via the Federal Reserve Automated Clearinghouse Network, via another financial institution network, or a remittance network such as a credit card network. Payments made to an electronic payee can be any type of payment, including, but not limited to, payment of a bill issued by a payee, a point-of-sale payment for goods or services purchased via a network interface, and a person-to-person payment. A bill can include a paper bill as well as an electronic bill delivered via a network.

The system includes a communications interface, a processor, and a database identifying electronic payees. The communications interface is configured to receive, via one or more networks, information associated with electronic commerce, as will be described below. The one or more networks can include, but is not limited to, the Internet, a local area network, a wide area network, and the public switched telephone network, as well as any other network capable of transmitting information. The processor could be any type of processor capable of functioning to implement the method as described herein, including, but not limited to, a processor as found in a typical personal computer, mainframe computer, server-type computer, or any other type computing device. The database is a collection of information associated with electronic payees. The database could also include other information beyond that associated with electronic payees, such as, for instance, information associated with payees that are not electronic payees.

First information identifying a payee is received. The information could be received from a payor or from an entity representing the payor, such as a Web portal, financial institution, or other entity. The payor could be an individual, a business, or organization. A payor is an entity that makes payments to a payee. A payee is an entity receiving payment. The information identifying a payee could include any of, any combination of, or all of, a payee name, address, zip code, and telephone number, in addition to other payee identifying information. The information is preferably received by a payment service provider, though it could be received by another entity practicing the present invention. It should be noted that the information identifying the payee could be received as part of a payment request to pay the payee on behalf of the payor, or received otherwise, such as in a request to add the payee to a list of payees.

The received first information is processed to identify a unique payee identifier associated with the payee. No other payee is associated with this payee identifier. The unique payee identifier is assigned to the payee only after the payee responds to an invitation to receive electronic payments. The invitation is associated with a paper payment made to the payee. The paper payment could be a check or a draft. The invitation could be a printed invitation delivered with the paper payment, or could be an electronic invitation such as an e-mail message. In any event, the paper payment triggers the extension of the invitation to receive electronic payments Information associated with the payee stored in the database of electronic payees is accessed based upon the identified unique payee identifier. That is, the unique payee identifier is used to locate information associated with the payee contained in the electronic payee database. The accessed information associated with the payee could be any information associated with the payee, including information necessary to make an electronic payment to the payee.

According to one aspect of the method and system of accessing a database identifying electronic payees, the payee is a first payee. Second information identifying a second payee is received. The second payee is not associated with a unique payee identifier. That is, the second payee has not requested to receive electronic payments. Information associated with the second payee stored in the electronic payee database is accessed based upon the received identifying information. Thus, the database is accessed two ways, by a unique payee identifier, and by received payee-identifying information.

According to a further aspect of this method and system, the first information is publicly available information identifying the first payee, and the second information is publicly available information identifying the second payee. Thus, publicly available information is utilized to identify a unique payee identifier, which then is utilized to access the database. Preferably, the unique payee identifier is not known to the public. Publicly available information is also utilized to directly access the database without the use of a unique payee identifier.

In another aspect of the method and system for accessing a database identifying electronic payees the unique payee identifier identifies a demand deposit account belonging to the payee to which electronic payments to the payee should be directed. Thus, the unique payee identifier is stored in association with information identifying a demand deposit account in the database.

According to a still further aspect of this method and system, the unique payee identifier identifies the demand deposit account as well as a remittance location to which remittance information should be directed. Remittance information, also known as remittance advice, is information associated with a payment, such as a payment amount, information identifying a payor, and information indicating apportionment of a total payment amount from a payor across different line items or sub-accounts. However, remittance information can include other information. The remittance location could be an electronic location or a physical location. The electronic location could be different than the payee's demand deposit account. Thus, electronic payments could be directed to one location, while electronic remittance information associated with those payments could be directed another location. Also, payments could be electronically directed to one location, while remittance information associated with those payments could be delivered in hard copy to a physical location, which could be a fax machine, physical mail box, or other type of physical location.

In an especially beneficial aspect of this method and system the invitation is an invitation to receive electronic payments from the payor. Also, the unique payee identifier identifies an association between the payee and only the payor. The unique payee identifier, according to this aspect, does not identify an association between any other payor and this payee. The unique payee identifier is only utilized in relation to processing which is associated with both this payor and this payee.

Also in accordance with the present invention, a method and a system for making a payment to a payee on behalf of a payor are provided. A payee as well as a payor could be any individual, business, or other organization. The payment can be any type of payment, including, but not limited to, payment of a bill issued by a payee, a point-of-sale payment for goods or services purchased via a network interface, and a person-to-person payment. A bill can include a paper bill physically delivered to a payor, as well as an electronic bill delivered to a payor via a network.

The system includes a communications interface and a processor. The communications interface is configured to receive, via one or more networks, information associated with electronic commerce, as will be described below. The one or more networks can include, but is not limited to, the Internet, a local area network, a wide area network, and the public switch telephone network, as well as any other network capable of transmitting information. The processor could be any type of processor capable of functioning to implement the method as described herein, including, but not limited to, a processor as found in a typical personal computer, main-frame computer, server-type computer, or any other type computing device. According to certain aspects of this system, the system also includes a database which stores information associated with electronic payees. As described above, an electronic payee is any individual, business, or other organization that has provided an entity that makes payment to that payee information enabling the paying entity to make electronic payments to the payee. The database could be stored in any type memory, including, but not limited to, hard disk, floppy disk, and optical disk.

A payment request to make a payment to a payee on behalf of payor is received. The payment request could be received directly from a payor, or from an entity acting on behalf of the payor, including the payee. The payment request is an instruction directing the entity receiving the payment request to make a payment to the payee for the payor. Thus, in accordance with this method and system, a payor does not deliver funds, negotiable instruments, or other payment instruments directly pay a payee. Rather, a payment service provider completes funds delivery to the payee on behalf of the payor.

The received payment request is processed to identify a unique payee identifier associated with the payee. As discussed above, no other payee is assigned this same identifier. Also as above, this unique payee identifier has previously been assigned to the payee only after the payee requests to receive electronic payments responsive to an invitation to receive electronic payments associated with a paper payment. An electronic payment is directed to the payee based upon the identified unique payee identifier. That is, payment is made to the payee on behalf of the payor only after the unique payee identifier is identified. Further, the unique payee identifier is used in processing which results in delivery of funds to the payee.

According to one aspect of the method and system for making a payment to a payee on behalf of a payor the unique payee identifier identifies a demand deposit account belonging to the payee to which electronic payments to the payee should be directed.

According to a still further aspect of this method and system, the unique payee identifier identifies the demand deposit account as well as a remittance location to which remittance information should be directed. Also, the remittance location could be an electronic location or a physical location. The electronic location could be different than the payee's demand deposit account. Thus, as discussed above, electronic payments could be directed to one location, while remittance information associated with those payments could be directed another location. Also, payments could be electronically directed to one location, while remittance information associated with those payments could be delivered in hard copy to a physical location.

According to an especially beneficial aspect of this method and system, the unique payee identifier is not based upon publicly available information identifying the payee. That is, the unique payee identifier is not generated or otherwise produced utilizing information about the payee known to the public.

In another aspect of the method and system for making a payment to a payee on behalf of a payor the unique payee identifier is stored in a database of payees capable of receiving electronic payments. Such a database is described above. Information necessary to direct the electronic payment to the payee is retrieved from the database based upon the identified unique payee identifier. This necessary information could include information identifying a demand deposit account belonging to the payee, but it could include other or additional information, such as information identifying a remittance network.

According to another aspect of this method and system, the payment to the payee is a first payment is directed to a first demand deposit account belonging to the payee. The invitation is an invitation to receive electronic payments from the first payor. Also according to this aspect, another payment request is received from another payor. This other payment request also requests that a payment be made to the payee, but on behalf of this other, second, payor. Information associated with the second payor is accessed to identify a second unique payee identifier associated with the payee. This second unique payee identifier is assigned to the payee subsequent to receiving a request from the payee to receive electronic payments from the second payor. Thus, the second unique payee identifier is stored in association with information associated with the second payor. Based upon the second unique payee identifier a second electronic payment is directed to a second demand deposit account belonging to the payee.

The second unique payee identifier is either the same as or different than the first unique payee identifier. If the first and second unique payee identifiers are the same, the first and second demand deposit accounts are the same. If the first and second unique payee identifiers are different, the first and second demand deposit accounts are different demand deposit accounts. Thus, the payee can identify a single demand deposit account to which payments made on behalf of multiple payors will be directed. Or, the payee can identify multiple demand deposit accounts, with payments made on behalf of one payor directed to a first demand deposit account, and payments made on behalf of another payor directed to a second demand deposit account. In such a case, a unique payee identifier identifies not only the payee, but also a demand deposit account belonging to the payee.

In a further aspect of this method and system, remittance advice associated with the first payment is directed to a first remittance location, while remittance advice associated with the second payment is directed to a second remittance location. The first remittance location could be an electronic location or a physical location. Likewise, the second remittance location could be an electronic location or a physical location. If the first and second unique payee identifiers are the same, the first and second remittance locations are the same. If the first and second unique payee identifiers are different, the first and second remittance locations are different remittance locations. Thus, similar to demand deposit accounts, remittance advice is directed based upon a unique payee identifier.

According to yet another aspect of the method and system for making a payment to a payee on behalf of a payor the payment request is a first payment request, the payee is a first payee, and the electronic payment is a first electronic payment. A second payment request is received from the payor. The second payment request requests that a payment be made to another, second, payee. The second payment request is processed to identify a unique payee identifier associated with the second payee. In this aspect, the second payee is not associated with a unique payee identifier.

Information necessary to direct a second electronic payment to the second payee is retrieved from an electronic payee database based upon publicly available information identifying the second payee. The second electronic payment is directed to the second payee based upon this retrieved information. A payee does not have to be associated with a unique payee identifier to receive electronic payments in accordance with this aspect of the method and system for making payment. Thus, a payee does not have to respond to an invitation associated with a paper payment to receive electronic payments.

In still another aspect of this method and system a notice indicating that the electronic payment has been directed is transmitted to the payee. This notice includes either remittance information associated with the payment, or a notice that remittance information associated with the payment is available.

According to a further aspect of this method and system, the notice includes a hyperlink to view the remittance information. Thus, the payee must actively request remittance information in this further aspect.

In still another aspect of this method and system, processing the received payment request to identify the unique payee identifier includes accessing information associated with the payor and retrieving the unique payee identifier from the information associated with the payor. Thus, the payee's unique identifier is stored with information associate with the payor.

According to yet another aspect of the method and system for making a payment to a payee on behalf of a payor the invitation is an invitation to receive electronic payments from the payor and the unique payee identifier identifies an association between the payee and only the payor. Thus, the unique payee identifier does not identify an association between any other payor and the payee, according to this aspect, as discussed above.

Also in accordance with the present invention, a database for storing information identifying payees capable of receiving electronic payments is provided. The database includes first data associated with a payee capable of receiving electronic payments. This first data could include, but is not limited to, payee identifying information, information identifying a demand deposit account belonging to the payee, a remittance location associated with the payee, or a remittance network.

The database also includes second data stored in association with the first data. Thus, the first and second data are linked in the database. The second data includes a unique payee identifier which identifies the payee. This unique payee identifier is assigned to the payee only after receipt of a request from the payee to receive electronic payments from a payor. This request to receive electronic payments is responsive to an invitation to receive electronic payments. The invitation is associated with a paper payment to the payee.

In one aspect of the database the payee is a first payee. The database also includes third data associated with a second payee capable of receiving electronic payment. This second payee is not associated with a unique payee identifier. Thus, the database stores information associated with electronic payees that have been assigned unique payee identifiers and information associated with electronic payees that have not been assigned unique payee identifiers.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 8 is a simplified depiction of an electronic payee database in accordance wit the present invention.

DETAILED DESCRIPTION OF PREFERRED EMBODIMENT(S)

Figure 1:
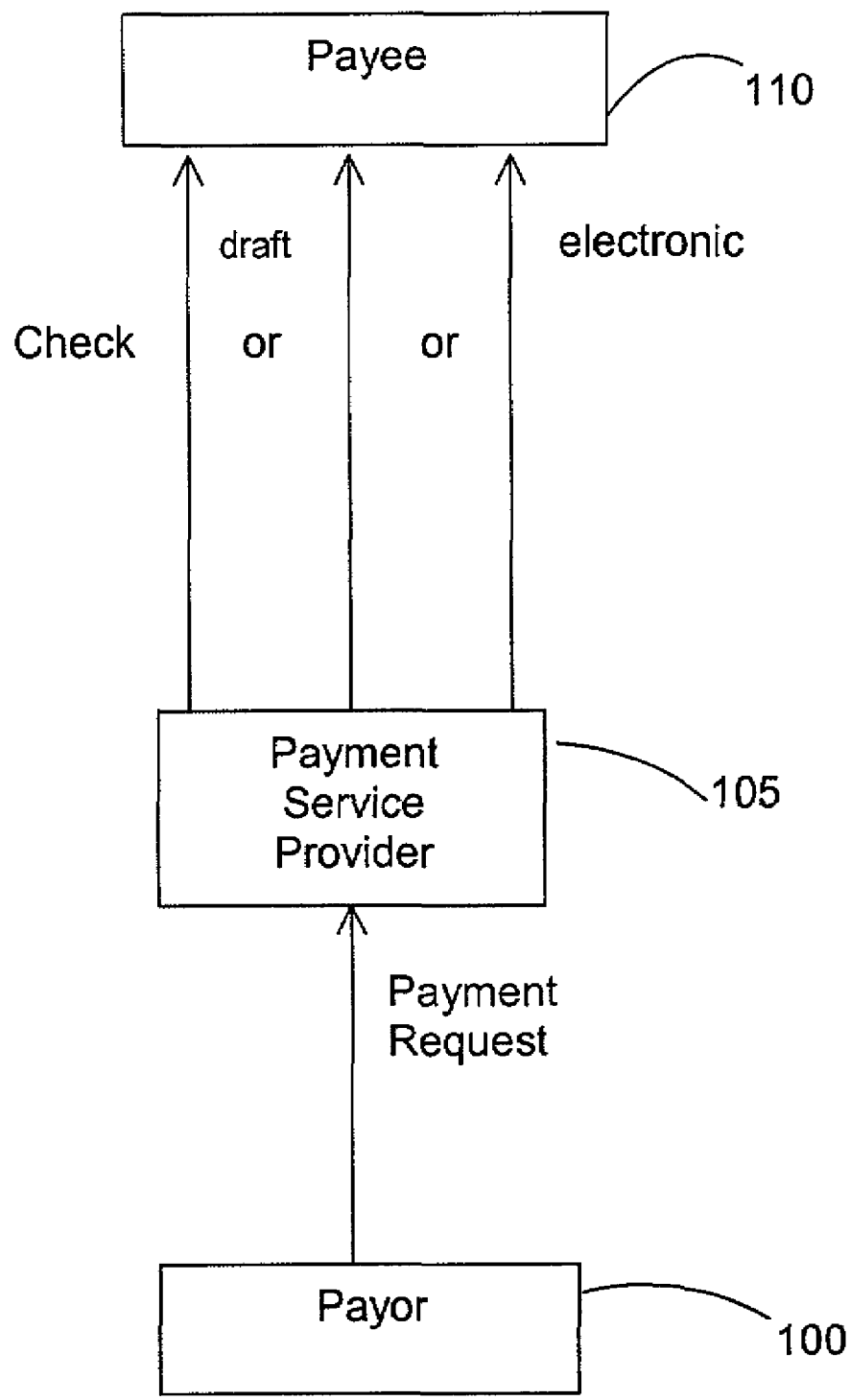
FIG. 1 is a simplified depiction of the processing of a prior art on-line payment service.
Figure 2:
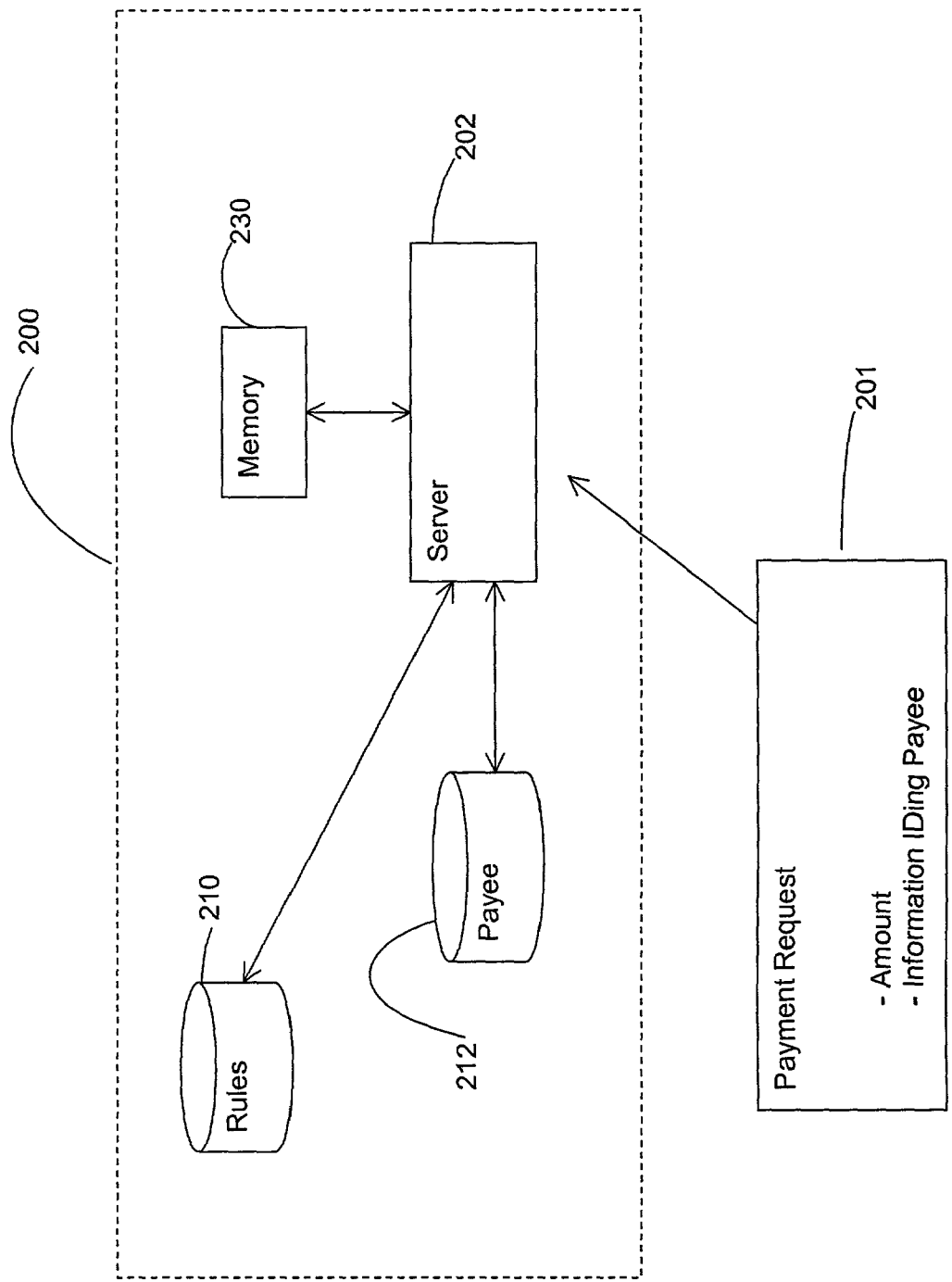
FIG. 2 depicts a prior art on-line payment service computing system.
Figure 3:
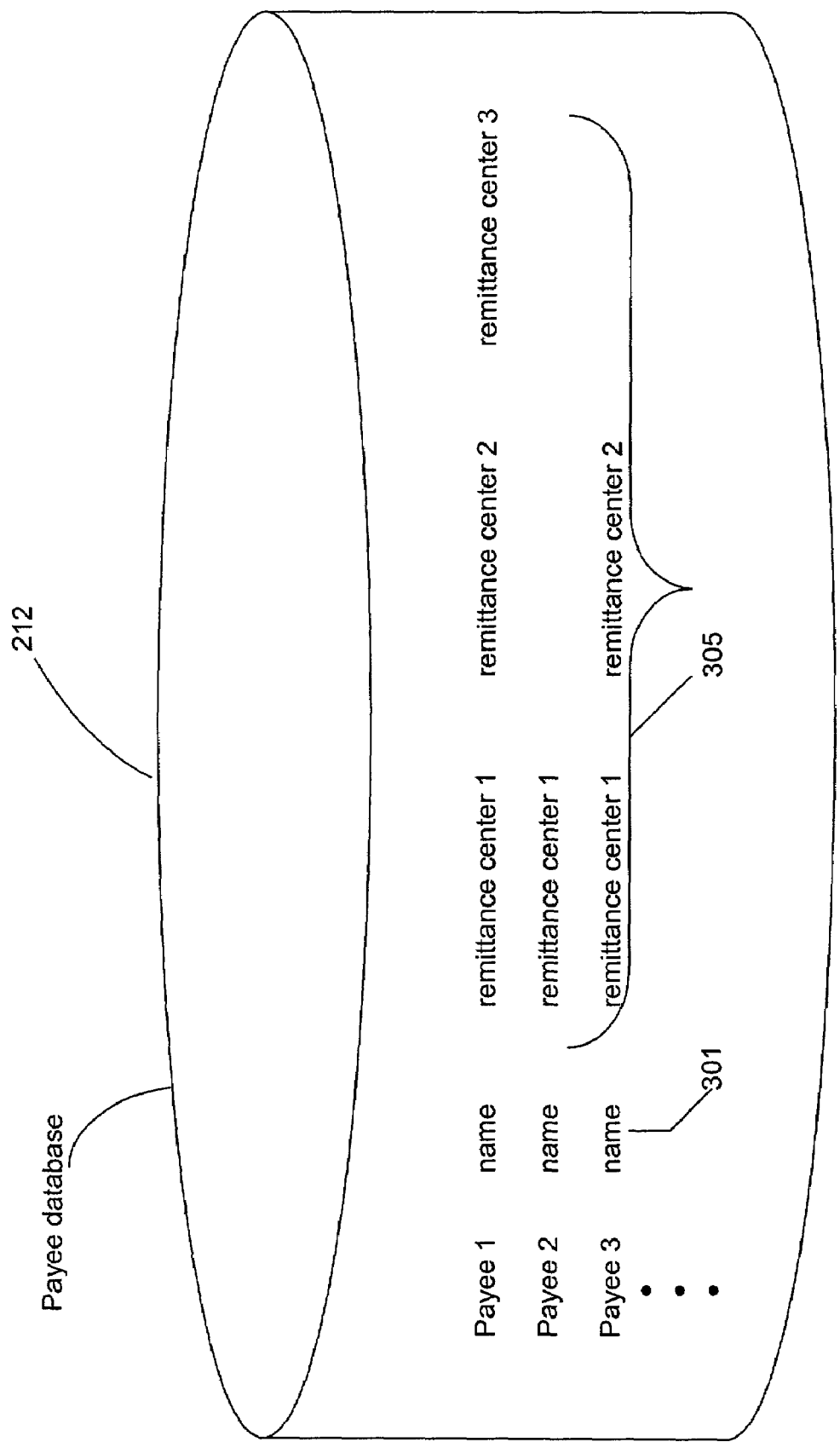
FIG. 3 is a simplified depiction of a prior art electronic payee database.
Figure 4:
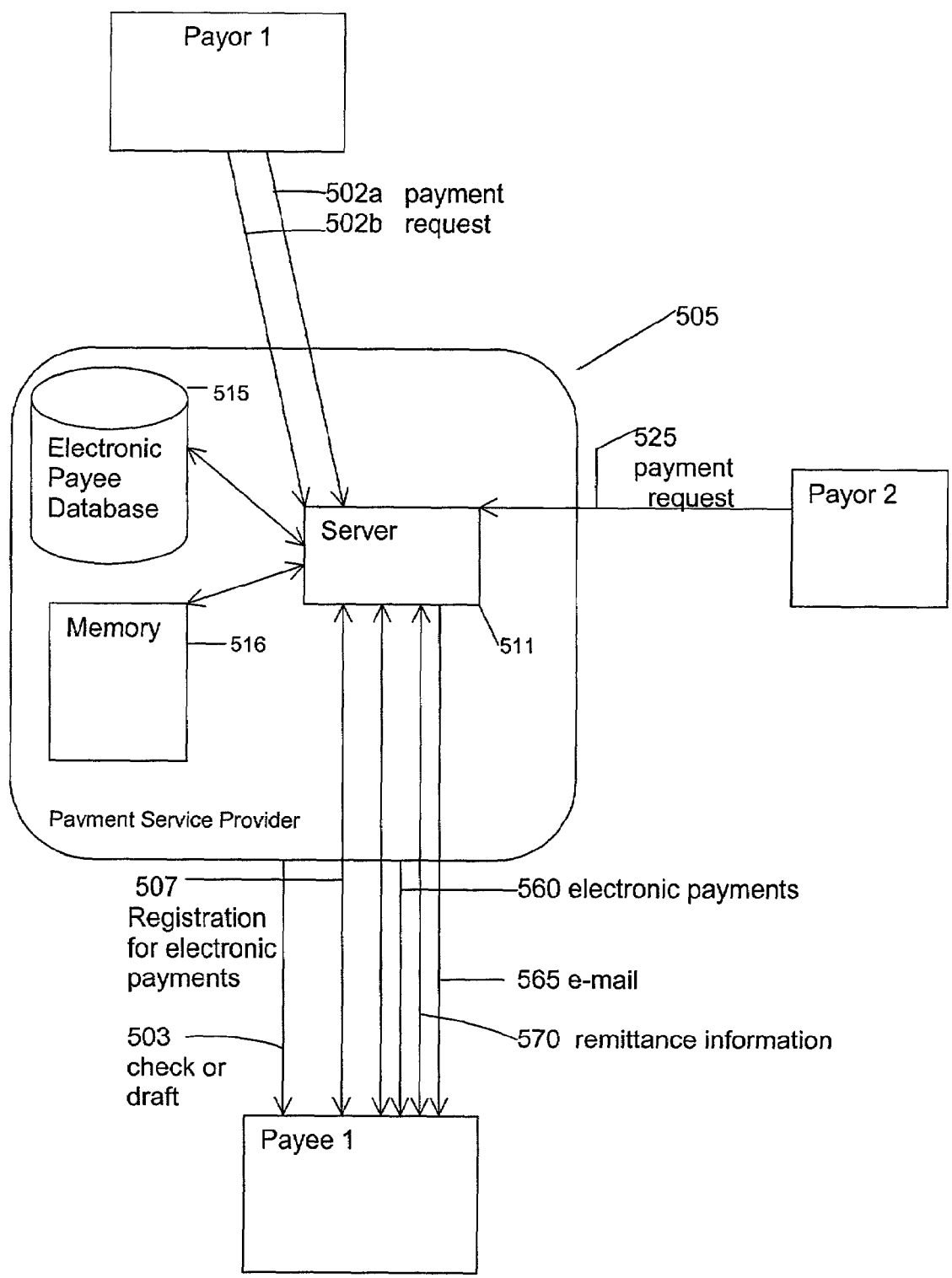
FIG. 4 depicts a check having an advertisement for receipt of electronic payments in accordance with the present invention.

payment service provider has a built-in communication channel with any payee receiving payment via check or draft, the check or draft itself. Thus, the check or draft is the most effective place to advertise availability of electronic payments for those payees receiving paper payments. An example of a check 400 is shown in FIG. 4. To advertise this availability, an insert could be included in an envelope which includes the check or draft advertising the possibility of receiving electronic payments. Secondly a message itself could be printed on a check or draft. Inserting a flyer into the envelope with a check or draft has the advantage of being able to provide a more descriptive compelling message. Printing an advertisement on a check or draft has the advantage of incurring no increase in stock cost and no increase in insertion time. No matter the form of advertisement, a payee receiving paper payment is notified of the availability of electronic payments.

Figure 5:
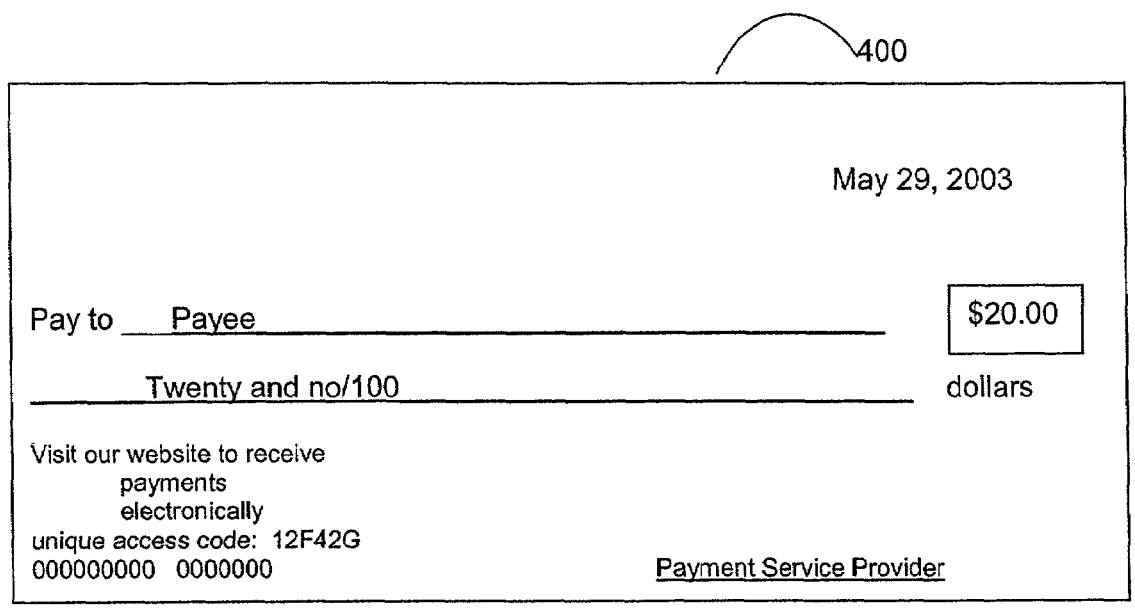
FIG. 5 is a simplified depiction of a payment service provider in communication with first and second payors and a payee.

In accordance with the present invention and as shown in FIG. 5, payor 1 directs a payment service provider 505 to make a payment to payee 1 on the payor's behalf by way of first payment request 502*a* transmitted to a server 511. As will be discussed in detail below, the payment service provider 505 determines if payee 1 can receive electronic payments. If not, payment will be made by either check or draft 503. The check or draft 503 is generated by the payment service provider 505. Information associated with the payment request and payment is stored in memory 516, which also stores other information. The stored information includes information identifying payee 1 received from payor 1.

As shown in FIG. 4, a check 400 (or draft) includes an advertisement to entice payees to register to receive payments electronically. The advertisement of FIG. 4 includes a payment service provider 505 website identifier and an access code. Of course, as described above, the advertisement could be delivered to the payee in an insert with check 400 (or draft), as well as separate letter. If the payees fax number or e-mail address can be discovered, the advertisement could be delivered via either of these routes.

The access code is utilized for fraud prevention. It is most preferable to generate a random sequence of characters and numbers that can be used as this unique access code. Use of this code ensures that someone cannot log onto a service provider website and redirect another payee's payments into their own deposit account without having received a paper payment from the service provider. In addition to the access code, entry of one or more of multiple fields from the check 400 (or draft), that would only be known by the person receiving the check 400 (or draft), is required once the payee logs onto the payment service provider website.

After accessing the payment service provider website, advertised on or included as an insert with the check (or draft) 400, to initiate an on-line, real-time, registration session 507, payee 1 is prompted to enter preferably three data elements, check number, payment amount, and access code. The server 511 retrieves the stored information associated with the payment and determines if the correct information has been entered. Ideally, in order to build the utmost confidence in the minds of payees, an image of the check that looks exactly like the check in the hands of a payee should be displayed upon a determination that the correct information has in fact been entered. Of course, the required data elements could be data which is related to the invitation, not data that is related to the payment itself.

Payee 1, upon providing correct information, will be required to register to receive electronic payments. Registration, in which a secure user name and password will be issued, also allows payee 1 to view details of all received electronic payments either via a web interface or via email. Payee 1 will also be given the opportunity to download this payment detail (remittance) information, to be discussed further below. Payee 1 must provide information to the payment service provider 505 during registration. This information will be stored in an electronic payee database 515. The information includes a preferred payee name, preferred payee address, payee telephone number, payees bank name, payees bank routing transit number, payees bank deposit account number, payees primary e-mail address, any other e-mail addresses, a log-in name, and a password. Once this information has been populated into the electronic payee database 515, and stored in memory 516, discussed further below, payee 1 can receive payments electronically from payor 1.

During an on-line registration process, the information stored in memory 516 during the payment request processing described above is retrieved. This retrieved information is used to pre-populate the on-line registration form completed by payee 1. In particular, the payee name received from payor 1 is inserted into the on-line form, the payee address (remittance center) received from payor 1 is inserted into the on-line form, along with any other payee identifying information received from payor 1. Also, the payor's account number with payee 1, if received, is inserted into the on-line form. Thus, payee 1 does not have to supply any of this pre-populated information received from payor 1. It should be noted that payee 1 can modify any of the pre-populated information, in addition to supplying information not received from payor 1.

In addition to the payor-identifying information received from payor 1 and/or payee 1 that is populated into the electronic payee database 515, other information generated by the payment service provider 505 is also populated into the electronic payee database 515. This information includes an alternate name for payee 1 which is only known by the payment service provider 505. This alternate name is unique to payee 1. Use of the alternate payee name will be discussed further below.

Though a simplified on-line and real-time registration is discussed above, a payee could also register in a non-real-time fashion. This could include registration by letter, fax, or email. In non-real-time registration, a payee supplies the same information to the payment service provider as required in on-line registration. The payment service provider processes the received information to complete the registration process.

It should be noted that during the registration process, whether on-line or not, the payee must accept certain terms and conditions. This preferably includes a reversibility condition. If the payment service provider 505 does not receive funds associated with a payment to payee 1 from payor 1 subsequent to the payment service provider 505 electronically crediting an account belonging to payee 1, payee 1 must agree that the credited funds will be recaptured by the payment service provider 505 from payee 1. This recapture could be by a net settlement procedure or an electronic debit, among ways to recapture funds.

The alternate payee name, introduced above and also known as a unique payee identifier, is stored by the payment service provider 505 in at least two locations. First, the alternate payee name is stored in the electronic payee database 515 in association with other information identifying and associated with payee 1. Secondly, the alternate payee name is stored in memory 516 along with other information associated with payor 1.

As shown in FIG. 5, a second payment request 502*b* to pay payee 1 is received from payor 1. Introduced above, upon receipt of a payment request, in this example second payment request 502*b*, the payment service provider 505 determines if the indicated payee is an electronic payee. To accomplish this, server 511 accesses memory 516 and determines if a unique payee identifier which identifies payee 1 is stored in association with information associated with payor 1. If so, and as is the case in this example of a second payment to a now-registered payee, the unique identifier is used to access the electronic payee database 515 to retrieve information utilized to make an electronic payment 560 to payee 1.

It should be noted that if memory 516 did not contain a unique payee identifier for payee 1 (payee 1 had never registered for electronic payment via a check or draft invitation), the electronic payee database 515 is preferably accessed in an attempt to locate payee 1 based upon rules stored in a rules database (not shown in FIG. 5), as discussed above. That is, at this point, the payment service provider 505 does not know if payee 1 has previously supplied deposit account information to receive electronic payments in a conventional fashion (not based upon a check draft invitation). If payee 1 cannot be located in the electronic payee database 515 based upon both a unique payee identifier and rules, payment would then go as check or draft, with an invitation. It should be noted that information identifying a payee stored in the electronic payee database 515 which includes a unique payee identifier is never processed utilizing a rules database. Thus, the only way an entry in the electronic payee database 515 which includes a unique payee identifier is accessed is by way of the unique payee identifier first retrieved from memory 516 stored in association with a payor making payment to the payee.

It will be recognized that a payee, upon receiving multiple advertisements to entice the payee to register to receive payments electronically, instead of registering as described above, may instead contact the payment service provider 505 directly in order to receive electronic payments from all current and future payors. The payment service provider 505 may then choose to extend the use of the same unique payee identifier to all payors currently sending payments to this payee. The payment service provider could identify current and future payments from payors to this payee and make use of the unique identifier in all such payments. Alternatively, the payee could choose to be enrolled as an electronic merchant (payee) by way of conventional processing. In such a case, the payee would not be associated with a unique payee identifier. Rather, information associated with the payee would be added to the electronic payee database and the payee would be located in the electronic payee database 515 using conventional techniques, not the inventive unique payee identifier of the present invention.

In this example, payment is made to payee 1 electronically. Upon making an electronic payment to payee 1, the server 511 generates an email message 565 to payee 1 informing payee 1 that an electronic payment has been made. Based upon this email, or at any time, payee 1 accesses the payment service provider web site to retrieve remittance information 570. This is known as a 'pull' scenario, in that payee 1 must request remittance information. It should be noted that remittance information could also be automatically transmitted to payee 1. This is known as a 'push' scenario. Thus, for example, the e-mail message could include the remittance information. Also, a batch transmission of remittance information could periodically be transmitted to payee 1. This transmission could be sent via a computing network or via fax. It should also be noted that payee 1 could be notified of a received payment by a method other than email.

Figure 6:
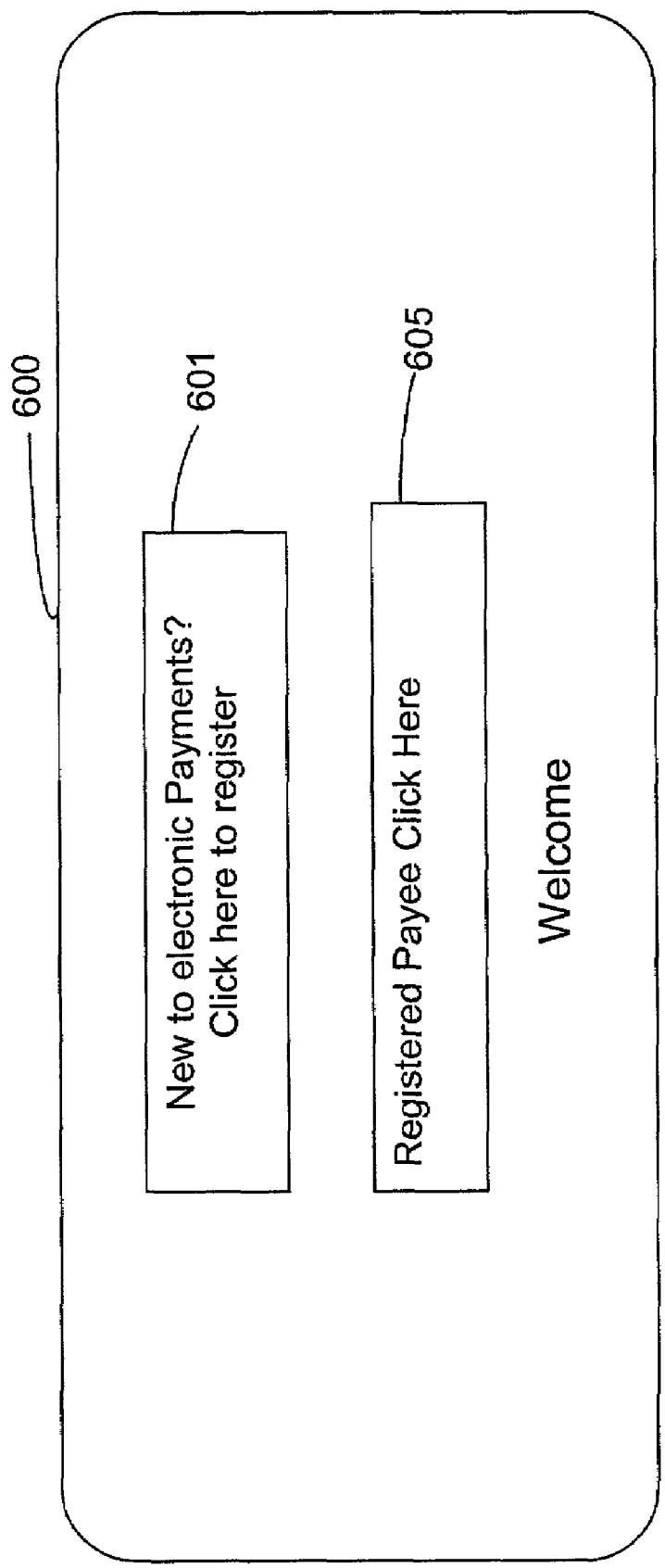
FIG. 6 is a simplified depiction of an initial log in screen in accordance with the present invention.
Figure 7:
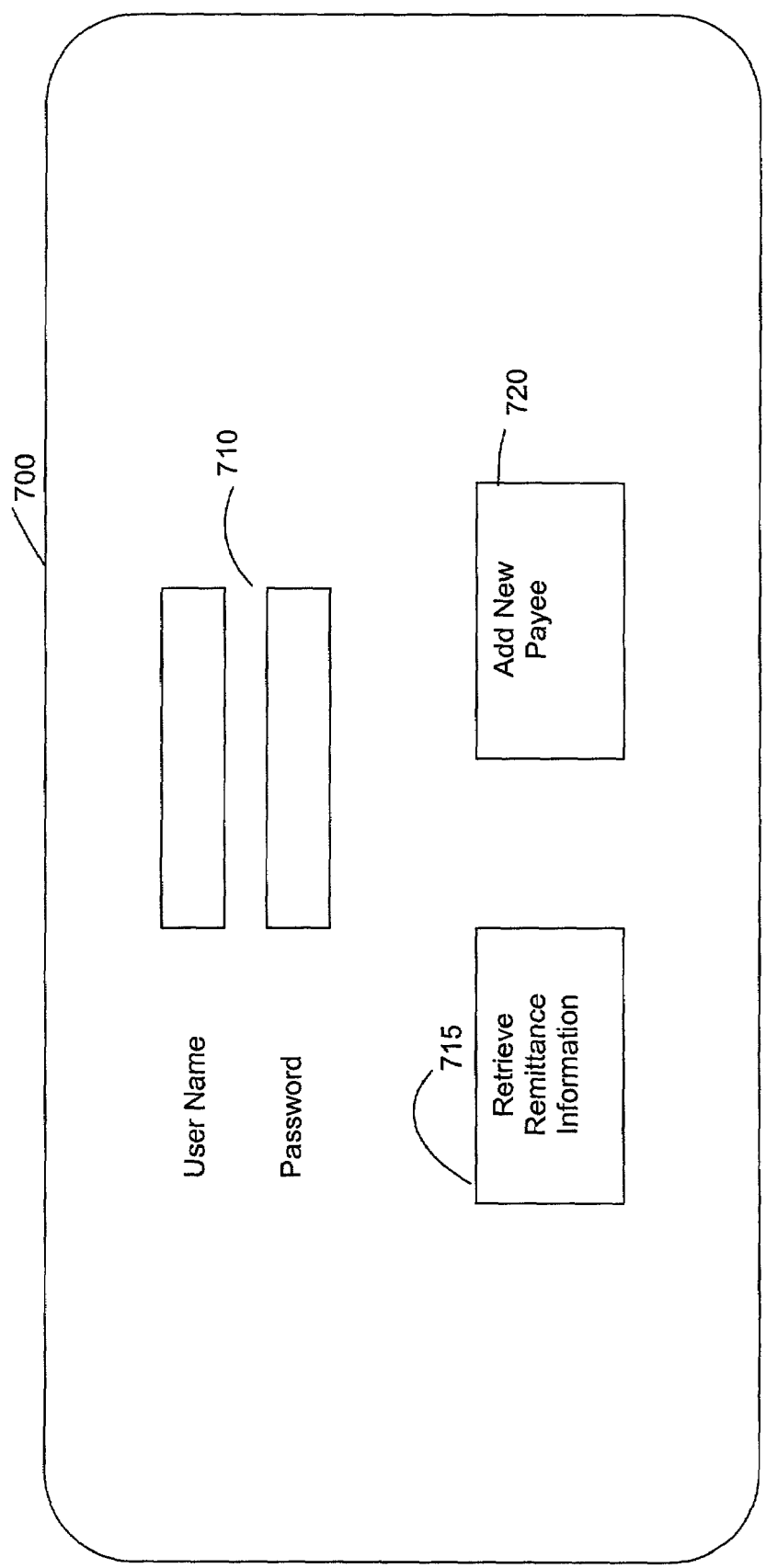
FIG. 7 is a simplified depiction of an identity screen in accordance with the present invention.

Whenever the payment service provider web site is accessed, an initial log in screen is presented. This screen 600, as shown in FIG. 6, includes a link 601 for previously unregistered payees to access the payment service provider 505 web site to register, and a link 605 for registered payees to access the payment service provider 505 website to add another payor, to receive remittance information, and to make any changes to stored information associated with the payee. For unregistered payees, activation of link 601 brings up another screen (not shown) in which the unique access code printed on a check or draft is entered. For registered payees, activation of link 605 brings up an identity screen, shown in FIG. 7. Identity screen 700 includes field(s) 710 to enter the unique user name and password assigned during the registration process, discussed above. Upon entry of this information, payee 1 can select a link 715 to remittance information for electronic payments made to payee 1, and link 720 to an add payor screen (not shown), in which the payee can add another payor. Adding additional payors will be discussed below.

The present invention supports payments to payees having multiple remittance centers by the use of multiple unique payee identifiers. As shown in FIG. 5, payor 2 transmits a payment request 525 to pay payee 1. In this example, payor 2 has a different remittance center with payee 1 than does payor 1. Upon receipt of payment request 525, the server 511 performs the above-described processing to determine if a unique payee identifier for payee 1 is stored in memory 516 in association with information associated with payor 2. In this example, no such identifier is stored. Next, based upon rules, the server 511 determines if payee 1 is otherwise included in the electronic payee database 515 by way of conventional registration (not check or draft invitation). In this example, payee 1 is not otherwise included in the electronic payee database 515. As a result, a paper payment, with another advertisement and another unique access code, will be delivered to payee 503.

Payee 1, to receive electronic payments from payor 2, must once again access the payment service provider's web site 507. Upon entering the web site, payee 1 selects link 605 and then enters his or her unique user name and password. Payee 1 then selects link 720 to add payor 2. Upon selection of the add payee link 720, payee 1 enters this second unique access code. Information associated with payment request 525 is then retrieved from memory 516, as well as information identifying the deposit account belonging to payee 1, and displayed as a pre-populated registration form. At this point, payee 1 makes any necessary changes and submits the information to the payment service provider 505. Because the pre-populated information, in this example, indicates a different remittance, center, received from payor 2, a second unique identifier associated with payee 1 is assigned to payee 1. This second unique identifier is stored in both memory 516 and the electronic payee database 515, as will be understood from the discussion above. This second unique identifier is linked to information identifying the second remittance center. It should be stressed that a single unique identifier, while associated with only a single remittance center, can be associated with multiple payors required to remit payment to that same remittance center.

FIG. 8 is a simplified depiction of electronic payee database 515, as shown, database 515 includes entries for payees 1 through N. Information included in database 515 includes, among other information, payee identifying information 805, any unique payee identifiers 810, and remittance center information 815. As shown, payee 1 is associated with two remittance centers and two unique identifiers. Payee 2 is associated with a single remittance center and a single unique identifier. Payee 3 is associated with a single remittance center and no unique identifier. Payee N is associated with two remittance centers and no unique identifiers. Thus, payees 1 and 3 are located in the electronic payee database 515 by way of unique identifiers, while payees 1 and N are located in the database 515 by conventional techniques, such as rules driven processing. Thus, the electronic payee database 515 of the present invention can be accessed two ways to locate a payee, by unique identifier known only to the payment service provider, and by publicly available identifying information.

It will be appreciated that multiple unique access codes for a single payee can be associated with different deposit accounts and/or different remittance centers. It will also be appreciated that if both remittance center and deposit account information are the same for two payors of a single payee, the same unique access code would be stored in association with information associated with each of these payors in memory 516.

For the 'pull' scenario in receiving remittance information 570, once a payee has accessed the payment service provider 505 web site and identified him or herself and requested remittance information, a total of the funds deposited on that day as well as a list of all payors making payment on that day are displayed. Information associated with each payor is also displayed. This information can include any or all of the following information: payor name, payor address, payor account number with the payee, and payment amount. It will be recognized by one skilled in the art that other remittance information could also be displayed. A payee is also given the option to enter a date in the past (preferably up to 90 days in the past) and review remittance information since that specified date.

It is quite likely that some of the payees will be using accounting software that can import a file into an accounts receivable system. As a convenience to payees, remittance information, preferably in the form of a comma-delimited file, can either be pulled by a payee, or pushed to a payee.

If the payment service provider 505 cannot obtain funds from a payor, preferably in multiple attempts, the payee will be notified that the payment will be reversed. That is, that the payee's deposit account will be settled accordingly. The payee can access the payment service provider 505 web site to obtain details of the situation. For each instance in which funds could not be obtained from a payor, the payee can view the payor name, payor address, payor account number with the payee, and payment amount.

The present invention is not to be limited in scope by the specific embodiments described herein. Indeed, various modifications of the present invention in addition to those described herein, will be apparent to those of skill in the art from the foregoing description and accompanying drawings. Thus, such modifications are intended to fall within the scope of the appended claims.

What is claimed is:

1. A computer implemented method for making a payment to a payee on behalf of a payor, comprising:

receiving, by a payment service provider, a first payment request to make a first payment to a payee on behalf of a first payor, the first request having first payee identity information, and a second payment request to make a second payment to the payee on behalf of a second payor, the second request having second payee identity information;

identifying a first payee identifier based upon the identity of the first payor and at least a portion of the received first payee identity information, wherein the first payee identifier is not received in the first payment request and is assigned as a result of the payee responding to an invitation, from the service provider, associated with a paper payment to enroll for electronic payment;

identifying a second payee identifier based upon the identity of the second payor and at least a portion of the received second payee identity information, wherein the second payee identifier is not received in the second payment request and is assigned as a result of the payee responding to an invitation, from the service provider, associated with a paper payment to enroll for electronic payment;

directing, by the payment service provider, an electronic payment to the payee on behalf of the first payor using the first payee identifier, and an electronic payment to the payee on behalf of the second payor using the second payee identifier;

and transmitting to the payee, by the payment service provider via a network, a notice indicating that the electronic payment on behalf of the first payor has been directed; wherein the notice includes one of (a) information indicating that remittance information associated with the payment is available and (b) remittance information associated with the payment.

2. The method of claim 1, further comprising identifying a first demand deposit account belonging to the payee to which the electronic payment is directed on behalf of the first payor, and a second demand deposit account, different than the first demand deposit account, belonging to the payee to which the electronic payment to the payee is directed on behalf of the second payor.

3. The method of claim 1, further comprising:

directing, by the payment service provider, first remittance information to the payee associated with the electronic payment on behalf of the first payor, and second remittance information to the payee associated with the electronic payment on behalf of the second payor.

4. The method of claim 3, wherein the first remittance information is directed to a location different than the second remittance information.

5. The method of claim 1, wherein each of the first payee identifier and the second payee identifier is not based upon publicly available information identifying the payee.

6. The method of claim 1, wherein the second payee identifier is different that the first payee identifier.

7. The method of claim 1, wherein the notice includes the information indicating the availability of remittance information associated with the payment and a hyperlink to view the remittance information.

8. The method of claim 1, wherein:

the first payee identifier represents an association between the payee and only the first payor; and the second payee identifier represents an association between the payee and only the second payor.

9. A computer implemented system for making a payment to a payee on behalf of a payor, comprising:

a communications interface configured to receive a first payment request to make a first payment to a payee on behalf of a first payor, the first request having first payee identity information, and a second payment request to make a second payment to the payee on behalf of a second payor, the second request having second payee identity information; and a processor configured (a) to identify a first payee identifier based upon the identity of the first payor and at least a portion of the received first payee identity information, wherein the first payee identifier is not received in the first payment request and is assigned as a result of the payee responding to an invitation associated with a paper payment to enroll for electronic payment, (b) identify a second payee identifier based upon the identity of the second payor and at least a portion of the received second payee identity information, wherein the second payee identifier is not received in the second payment request and is assigned as a result of the payee responding to an invitation associated with a paper payment to enroll for electronic payment, and (c) to direct an electronic payment to the payee on behalf of the first payor using the first payee identifier and an electronic payment to the payee on behalf of the second payor using the second payee identifier;

the processor is further configured to direct transmission to the payee of a notice indicating that the electronic payment on behalf of the payor has been directed;

the communications interface is further configured to transmit the notice to the payee in accordance with the transmission directive; and the notice includes one of (a) information indicating that remittance information associated with the payment is available and (b) remittance information associated with the payment.

10. The system of claim 9, wherein neither the first payee identifier nor the second payee identifier is based upon publicly available information identifying the payee.

11. The system of claim 9, wherein the second payee identifier is different that the first payee identifier.

12. The system of claim 9, wherein the notice includes the information indicating that remittance information associated with the electronic payment is available and a hyperlink to view the remittance information.

13. The system of claim 9, wherein the first payee identifier is associated with a first demand deposit account belonging to the payee to which the payment on behalf of the first payor is directed, and the second payee identifier is associated with a second demand deposit account belonging to the payee to which the payment on behalf of the second payor is directed.

14. The system of claim 9, wherein:

the processor is further configured to direct first remittance advice to the payee corresponding to the electronic payment on behalf of the first payor, and second remittance advice to the payee corresponding to the electronic payment on behalf of the second payor.

15. The system of claim 9, wherein:

the first payee identifier identifies an association between the payee and only the first payor; and the second payee identifier identifies an association between the payee and only the second payor.

* * * * *